United States Patent
Gandel et al.

(10) Patent No.: US 6,573,709 B1
(45) Date of Patent: Jun. 3, 2003

(54) POSITION SENSOR WITH HALL PROBE

(75) Inventors: Pierre Gandel, Montfaucon (FR); Yann Buaillon, Besancon (FR)

(73) Assignee: Moving Magnet Technologies (S. A.), Besancon (FR)

( * ) Notice: Subject to any disclaimer, the term of this patent is extended or adjusted under 35 U.S.C. 154(b) by 0 days.

(21) Appl. No.: 09/856,136

(22) PCT Filed: Nov. 19, 1999

(86) PCT No.: PCT/FR99/02856

§ 371 (c)(1),
(2), (4) Date: Jun. 13, 2001

(87) PCT Pub. No.: WO00/31505

PCT Pub. Date: Jun. 2, 2000

(30) Foreign Application Priority Data

Nov. 20, 1998 (FR) ............................................. 98 14667

(51) Int. Cl.$^7$ ................................................. G01B 7/14
(52) U.S. Cl. .............................. 324/207.2; 324/207.24; 324/251; 74/471 XY
(58) Field of Search ................. 324/207.2, 207.21, 324/207.23, 207.24, 207.25, 207.26; 338/324, 128; 74/471 XY (56) References Cited

U.S. PATENT DOCUMENTS

| 3,194,990 | A | * | 7/1965 | Kendall .................... 310/10 |
| 4,320,669 | A | * | 3/1982 | Grohe ....................... 74/5.37 |
| 4,500,867 | A | * | 2/1985 | Ishitobi et al. ............. 338/128 |
| 4,639,667 | A | | 1/1987 | Andresen ................ 324/207.18 |
| 5,160,918 | A | * | 11/1992 | Saposnik et al. ............ 345/161 |
| 5,528,139 | A | * | 6/1996 | Oudet et al. .............. 324/207.2 |
| 5,532,585 | A | * | 7/1996 | Oudet et al. ............. 324/207.22 |
| 5,691,637 | A | * | 11/1997 | Oswald et al. .......... 324/207.23 |
| 5,969,520 | A | * | 10/1999 | Schottler ................. 324/207.2 |
| 6,201,389 | B1 | * | 3/2001 | Apel et al. ............... 324/207.2 |
| 6,232,771 | B1 | * | 5/2001 | Herden et al. .......... 324/207.25 |
| 6,400,144 | B1 | * | 6/2002 | Hannewald et al. ... 324/207.25 |

FOREIGN PATENT DOCUMENTS

| EP | 0 611 951 | 8/1994 |
| EP | 0 798 541 | 10/1997 |
| EP | 0 800 055 | 10/1997 |
| FR | 2 670 286 | 6/1992 |
| FR | 2 691 534 | 11/1993 |
| WO | WO 97/16736 | 5/1997 |

* cited by examiner

*Primary Examiner*—Edward Lefkowitz
*Assistant Examiner*—Darrell Kinder
(74) *Attorney, Agent, or Firm*—Oblon, Spivak, McClelland, Maier & Neustadt, P.C.

(57) ABSTRACT

A position sensor including at least one stator structure defining a secondary gap wherein is housed at least one Hall probe, and a mobile magnet in a main gap. The stator structure includes stator parts defining at least one first secondary gap wherein is housed at least one first Hall probe delivering a signal which is a function of the displacement of the mobile magnet relative to a first degree of freedom, and at least one second secondary gap wherein is housed at least one second Hall probe delivering a signal which is a function of the displacement of the mobile magnet relative to a second degree of freedom.

20 Claims, 8 Drawing Sheets

POSITION SENSOR WITH HALL PROBE

BACKGROUND OF THE INVENTION

1. Field of the Invention

The present invention relates to the domain of metrology, and more precisely to the domain of position sensors without contact with Hall probes.

2. Discussion of the Background Art

Hall probe sensors are known, which make it possible to determine the linear or angular position of a permanent magnet in relation to a stator structure.

The French patent FR2670286 is also known, relating to a magnetic sensor of position and speed with a Hall probe enabling acquisition of position or speed in a single dimension.

The European patent EP800055 describes a linear and angular position sensor. This sensor does not describe two gaps, and delivers analog signals which are difficult to use because they are non-linear, and low-level. Such sensors have two paths which are not independent.

SUMMARY OF THE INVENTION

Other patents such as the U.S. Pat. No. 4,639,667 or W09716736 describe sensors operating according to principles which do not permit delivery of linear and independent signals, representative of the position in two dimensions.

The aim of the invention is to propose a sensor making it possible to measure a position in space, according to two independent degrees of freedom.

To this effect, the invention concerns in its most general meaning a position sensor comprising at least one stator structure defining a secondary gap wherein is housed at least one Hall probe, and a mobile magnet in a main gap, characterised in that the stator structure is composed of stator parts defining at least one first secondary gap wherein is housed at least one main Hall probe, delivering a signal which is a function of the displacement of the mobile magnet relative to a first degree of freedom, and at least one second secondary gap wherein is housed at least one second Hall probe delivering a signal which is a function of the displacement of the mobile magnet relative to a second degree of freedom.

Preferably, the secondary gaps are formed of two pairs of secondary gaps. Each pair of secondary gaps contains two Hall probes arranged on either side of the intersection of the first pair of secondary gaps with the second pair of secondary gaps, and means for summation of the electric signals provided by the Hall probes placed in a same gap, to deliver a resulting signal closely proportional to the position of the magnet according t o the degree of freedom corresponding to each of the pairs of Hall probes.

Advantageously, the stator structure is composed of 4 poles in a magnetically soft material defining between them two pairs of secondary gaps crossing each other at a median point and in that the main gap is plane.

According to a first variant, the stator poles are constituted of 4 rectangular parts integral with a non-magnetic base and placed facing a support assembly and together defining two pairs of perpendicular secondary gaps.

According to a preferred embodiment, the L/E relation between the thickness L of the magnet and the thickness E of the gap is comprised between 1 and 2.

According to a second preferred embodiment, the dimensions of the secondary gaps are $C_1+E$ and $C_2+E$, where $C_1$ and $C_2$ define the path of the mobile magnet according to the two directions of the secondary gaps.

According to a second embodiment variant, the magnet is in the shape of a half-tube and is mobile according to a first degree of freedom in axial translation and according to a second degree of freedom in axial rotation relative to a stator structure formed of 4 stator poles in the shape of half-rings, and in that it comprises a first pair of Hall probes placed in a first pair of secondary gaps in the median transversal plane of the stator structure, for measuring the position according to the first degree of freedom, and a second pair of Hall probes placed in a second longitudinal secondary gap constituted by longitudinal slits separating the stator half-rings.

According to a third embodiment variant, the magnet is in the shape of a half-tube and is mobile according to a first degree of freedom in axial translation and according to a second degree of freedom in axial rotation relative to a cylindrical stator structure formed of 4 stator poles in the shape of half-cylinders, and in that it comprises a first pair of Hall probes placed in a first pair of secondary gaps in the median transversal plane of the stator structure, for measuring the position according to the first degree of freedom, and a second pair of Hall probes placed in a second longitudinal secondary gap in the longitudinal median plane separating the stator half-cylinders.

According to a preferred embodiment, the longitudinal edges of the stator half-cylinders are chamfered.

According to a fourth embodiment of the invention, the sensor according to the invention is characterised in that the magnet is spherical or hemispherical in shape and is mobile in spherical rotation relative to a stator structure in the shape of a spherical cap formed of 4 stator poles in the shape of a cap sector, and in that it comprises a first pair of Hall probes placed in a first pair of secondary gaps in a first median plane of the stator structure, for measuring the position according to the first degree of freedom, and a second pair of Hall probes placed in a second longitudinal secondary gap in a second median plane.

According to a fifth embodiment variant, the sensor is characterised in that the magnet is of a spherical o r hemispherical shape and is mobile in spherical rotation relative to a stator structure formed of 4 stator poles with internal spherical shape located around the equator of the magnet, and in that it comprises a first pair of Hall probes placed in a first pair of secondary gaps in a first median plane of the stator structure, for measuring the position according to the first degree of freedom, and a second pair of Hall probes placed in a second longitudinal secondary gap in a second median plane.

Preferably, the main gap is spherical in shape.

In a sixth embodiment variant, the sensor is characterised in that the magnet is spherical or hemispherical in shape and is mobile in spherical rotation around a stator structure of spherical shape formed of 4 stator poles in the shape of a quarter of a sphere, and in that it comprises a first pair of Hall probes placed in a first pair of secondary gaps in a first median plane of the stator structure, for measuring the position according to the first degree of freedom, and a second pair of Hall probes placed in a second longitudinal secondary gap in a second median plane.

BRIEF DESCRIPTION OF THE DRAWINGS

Advantageously, the stator sectors have chamfers.

The invention will be better understood by reading the following description, with reference to embodiment examples which are non-limiting, shown in the attached drawings where.

DETAILED DESCRIPTION OF THE PREFERRED EMBODIMENTS

In general, the invention concerns a new type of sensors making it possible to detect the position of a mobile part according to two degrees of freedom.

The applications are aimed in particular at:

computer applications: mouse, joystick industrial applications: pick and place automobile applications: gear lever, gear assistance.

Figure 1A:
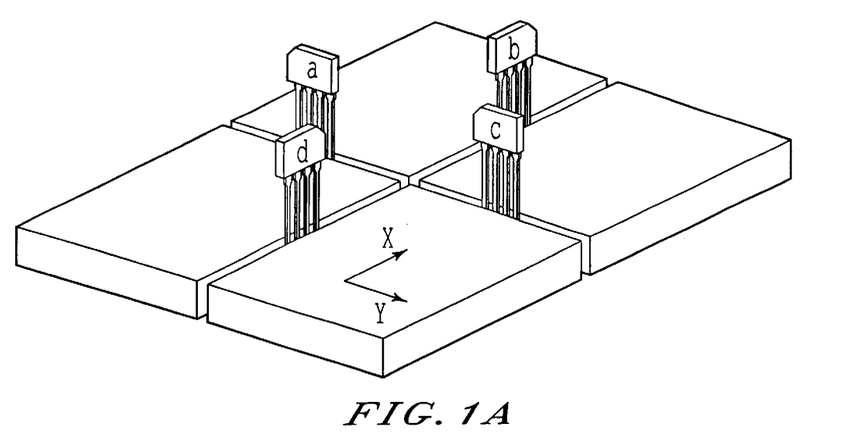
FIGS. 1 and 2 show a diagrammatic view respectively of the stator part and according to a cross-sectional view of a first embodiment variant under the form of a linear sensor XY.
Figure 1B:
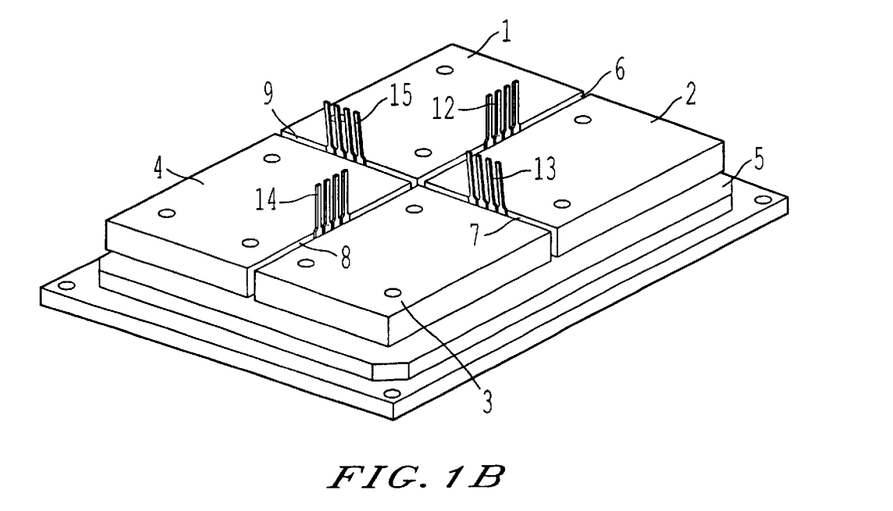
Figure 2:
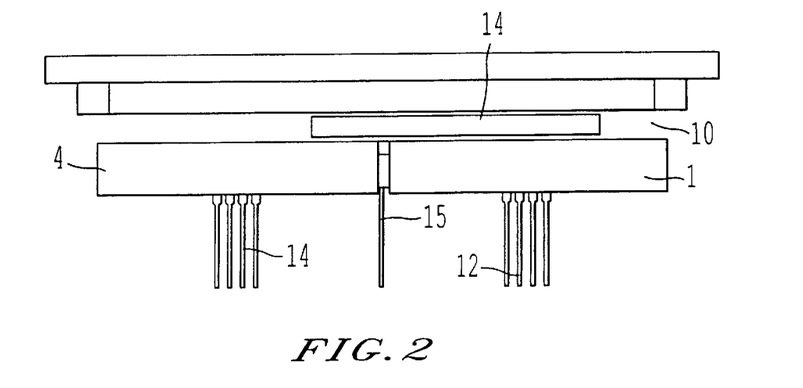

FIGS. 1 and 2 show respectively a schematic diagram of the stator part and a cross-section of a first embodiment variant under the form of a linear sensor XY.

The aim is to define the displacement of a mobile part in a plane at any instant, along a given path.

The sensor shown in FIGS. 1 and 2 has 4 stator poles, 1 to 4, in a magnetically soft material, square in shape, separated from a ferromagnetic support assembly 5 by a main gap 10.

A thin magnet 11, magnetised transversally, is mobile inside the main gap.

The 4 stator poles moreover define between them 4 secondary gaps 6 to 9. In each of them, a Hall probe is placed, 12 to 15, in order to determine the magnetic induction circulating from one pole to the other through the interaction between the magnet 11 and the iron mass of the stator structure formed by the stator poles, 1 to 4, and the support assembly 5.

The sensor is thus composed of a rectangular flat magnet 11, of 4 rectangular magnetically soft poles, 1 to 4, of 4 Hall probes, 12 to 15, (or any other component sensitive to magnetic induction variation), and of a rectangular ferromagnetic support assembly 5.

By displacing the magnet, a variation of magnetic potential is created at each pole which modifies the induction measured in each probe. One of the points of the invention consists in the addition of the probe signals. In fact, the sum of the signals provided by the probes 12 and 14 is a linear function of the displacement relative to the X axis and the sum of the signals provided by the probes 13 and 15 is a linear function of the displacement relative to the Y axis. Thus one can obtain a signal which can easily be exploited by adding these signals by an electronic summing assembly.

Then one will obtain 2 independent signals, linear respectively relative to the displacements in X and Y.

The compensation for the variation in behaviour of the magnet with temperature can be obtained by using single probes doubled by an appropriate circuit, but it is preferable to adopt integrated circuits combining the functions of Hall probes and compensation.

Figure 3A:
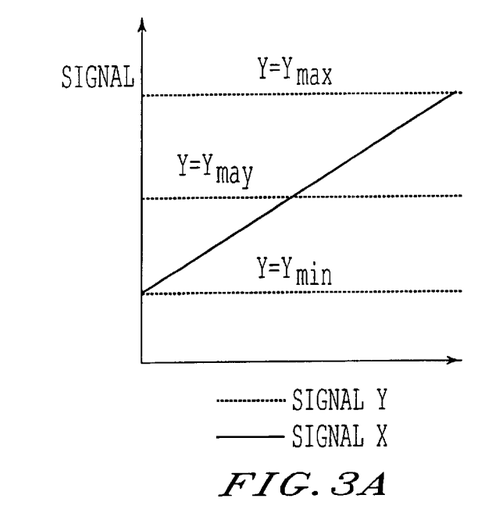
FIGS. 3a and 3b show typical measurement results for several magnet movements.
Figure 3B:
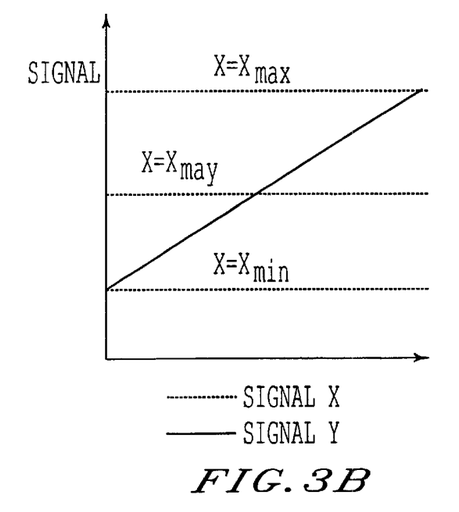

FIGS. 3a and 3b show the typical shape of the measurement results for several magnet displacements.

L is the thickness of the magnet, E that of the gap and $c_x$ and $c_y$ the paths of the probe in two dimensions.

It is advisable to use a ratio L/E comprised between 1 and 2.

If one takes the minimum dimensions of the stators ($c_x$+E) and ($c_y$+E) in the measurement plane, the linearity of the signal will be effective along the two axes.

Figure 4:
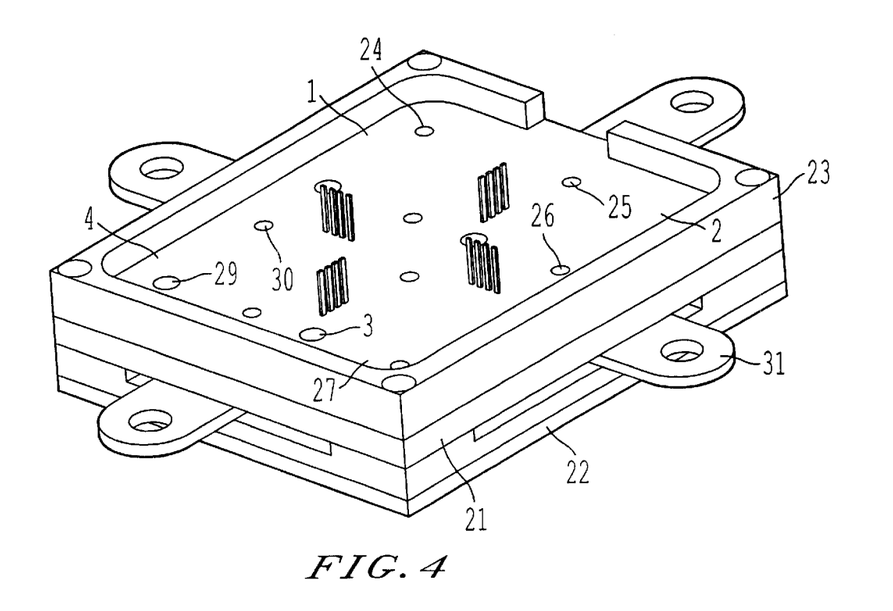
FIG. 4 shows a view in perspective of a sensor XY according to the first variant.

This design can easily be integrated into a compact system, according to FIG. 4.

The magnet is then inserted into a support 31 sliding between two spacers 21 and 22. The poles 1 to 4 are fixed on a non-magnetic base 23 and the assembly is linked by rigid fixation elements 24 to 30, for example screws, pins etc.

The support 31 has fixation lugs to link it with the element whose position is to be determined.

One thus obtains an integrable assembly, providing easily exploitable signals.

Figure 5:
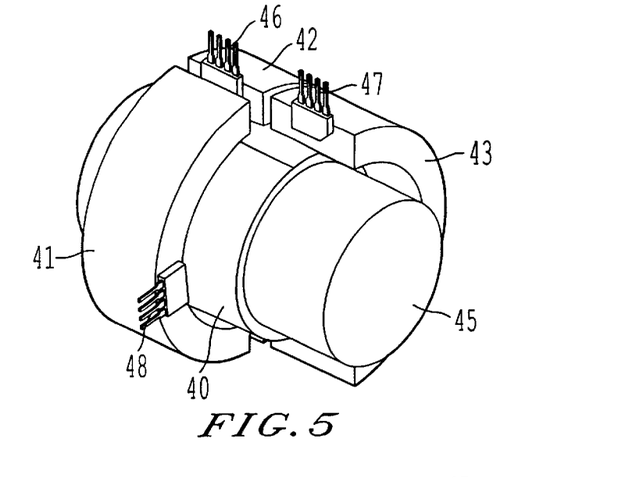
FIG. 5 shows a partial view of an angular linear sensor according to the invention.

FIG. 5 represents a partial diagrammatic view of a mixed sensor (x,θ), (linear+angular).

This system is composed of the following parts:

A half-ring magnet 40, magnetised radially. Depending on the requirements of the system, it can be stuck to the cylindrical support assembly 45 or can be mobile between the support assembly and the stators.

4 half-ring ferromagnetic stators 41 to 44 (the fourth stator is not shown in FIG. 5, so that the magnet is visible).

4 Hall probes, 46 to 49.

A cylindrical ferromagnetic support assembly 45, which can be solid or not.

Figure 6:
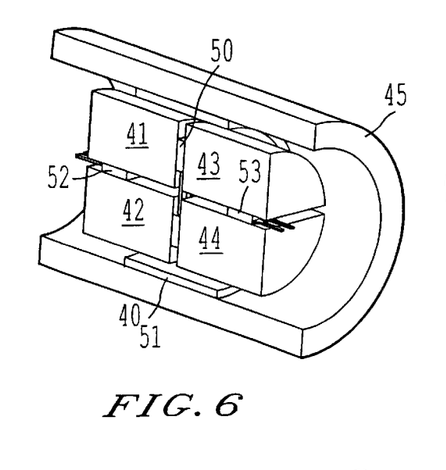
FIGS. 6 and 7 show partial views of an angular linear sensor according to an embodiment variant.
Figure 7:
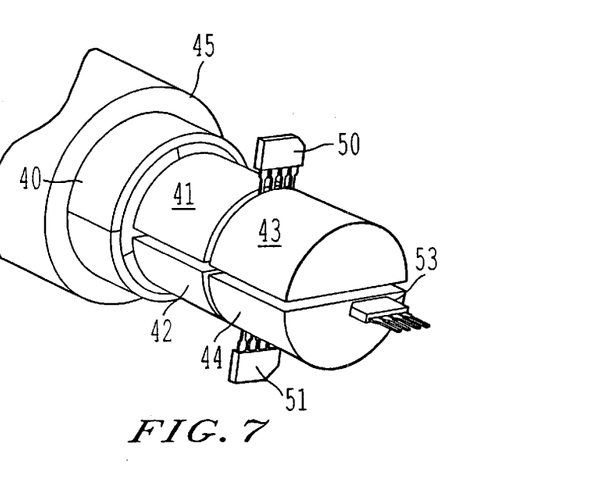

Another embodiment of this linear-angular sensor is shown in FIGS. 6 and 7: it consists of reversing this mechanism, that is to say of placing the support assembly 45 and the magnet 40 outside and the stators, 41 to 44, inside.

The stators 41 to 44 then become half-moons and the support assembly 45 becomes a ferromagnetic tube. The magnet 40 thus remains a half-ring radially magnetised and can be mobile between the stator 41 to 44 and the support assembly 45 or further attached to the latter.

In this architecture, the signals provided by probes 50 and 51 are added, that is the probes whose sensitive surface is perpendicular to the axis of rotation X, to obtain a linear signal in function of the linear displacement of the magnet according to axis X. Furthermore, one adds the signals provided by the probes 52 and 53, that is the probes whose sensitive surface is parallel to the axis of rotation X, to obtain a linear signal in function of the rotation of the magnet according to axis X. The angular path is limited to 180°, and in practice one will obtain a linear signal over a path of the order of 160°.

Finally one obtains two independent signals, respectively linear relative to the rotation and the displacement according to a same axis X.

Figure 8:
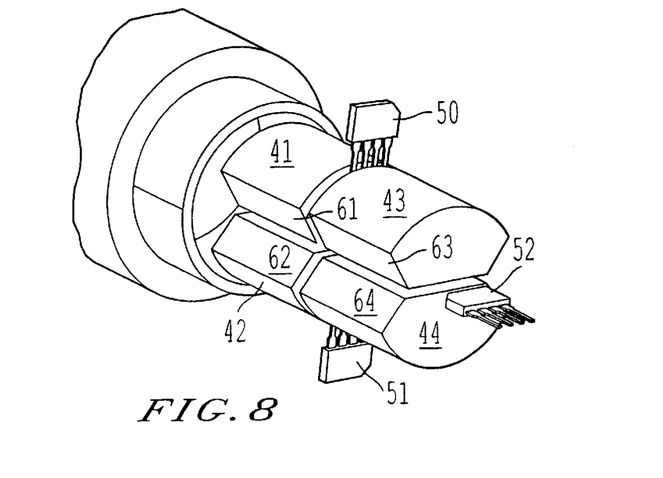
FIG. 8 shows a partial view of another embodiment variant of an angular linear sensor according to the invention.

A variant of this solution is shown in FIG. 8. It consists of making chamfers, 61 to 64, on the stators 41 to 44: then the sensitivity to rotation of the sensor is amplified by reducing its angular path.

In the same way as for the linear sensor XY, the sum of the signals is easily produced by a summing assembly. One can also use an integrated circuit comprising directly the element sensitive to the induction variation and the temperature compensation functions of the magnet.

Figure 9:
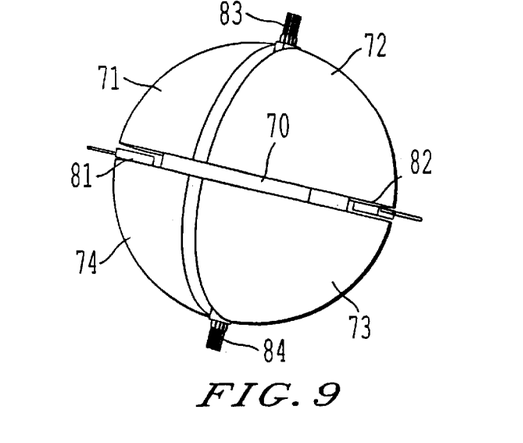
FIGS. 9 and 9' show respectively a view in perspective and in cross-section of a spherical sensor with two degrees of freedom in rotation.

FIG. 9 shows a diagrammatic view of a spherical sensor with two degrees of freedom in rotation.

Figure 10:
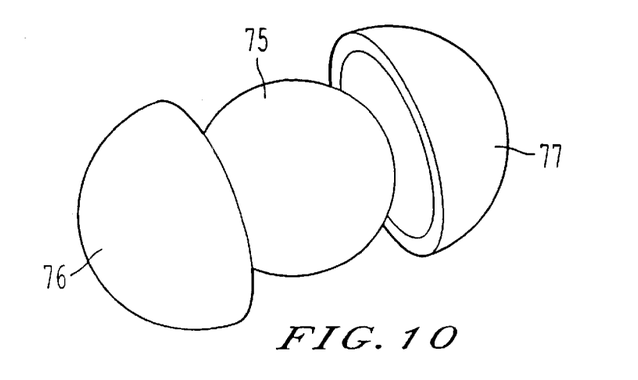
FIG. 10 shows an exploded view of a magnet and its support assembly for such a spherical sensor.

The system then comprises 4 types of parts:

A magnet 70, shown in FIG. 10 in an exploded view, composed of two half-magnets 76 and 77. These two half-magnets are hemispheres, are obtained preferably by moulding and are magnetised radially. The magnet 70 can be fixed on the support assembly 75 of spherical shape or be mobile between the stators and the support assembly.

4 ferromagnetic stators, 71 to 74, surrounding the magnet 70. In the basic principle shown in FIG. 9, these have the shape of a quarter of a spherical cap. It will be seen that this shape can be modified in industrial embodiments of this type of sensor.

4 Hall probes, 81 to 84, or any other element sensitive to variation in magnetic induction, placed between the stators 71 to 74, as shown in FIG. 9.

1 spherical ferromagnetic support assembly 75.

By making the magnet turn relative to the two axes X and Y, one creates a modification of magnetic induction in the 4 gaps in which the probes have been placed.

The addition of the signals provided by the probes 81 and 82 provides a linear signal in function of the rotation of the magnet relative to the axis X.

The addition of the signals provided by the probes 83 and 84 provides a linear signal in function of the rotation of the magnet relative to the axis Y.

Finally, 2 independent and linear signals are obtained, each in function of the rotation of the magnet relative to one of the 2 axes mentioned above.

It is to be noted that the rotation around the 3rd axis will have no influence on the 2 signals thus obtained.

Figure 11:
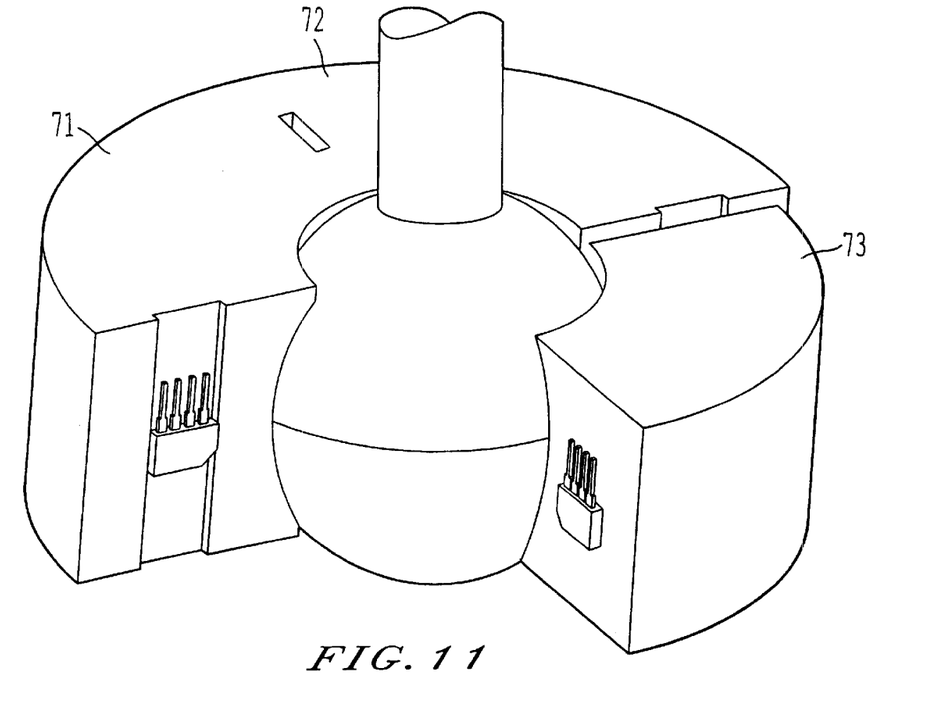
FIG. 11 shows an embodiment of a spherical sensor simpler for industrialisation.

FIG. 11 shows an embodiment of a spherical sensor which is easier to industrialise, in particular being able to be used in the manufacture of joysticks and other levers with two degrees of freedom.

First of all, one can limit the angular amplitude of the stators and simplify their external shape.

The stators 71 to 74 then have an internal spherical shape to keep a constant distance from the external surface of the magnet and an external surface which is cylindrical here but which can be adapted according to construction requirements.

Figure 12:
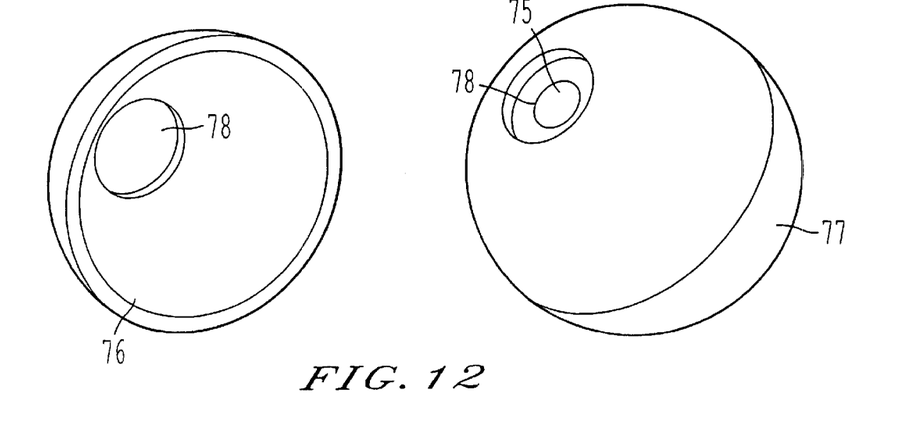
FIG. 12 shows a view of a magnet for a spherical sensor, mounted on its support assembly and alone.

Furthermore, one half-magnet 76 can be pierced, or the two, according to the number of mechanical connections needed and the results desired, as shown in FIG. 12. In this case, the hole made, 78, must remain fairly far from the stators during the movement of the mobile part, in order to maintain the correct signals. The presence of such a cavity 78 makes it possible to fix a mechanical part on the support assembly and thus to ensure the link between this measurement device and the mechanism whose displacement is to be measured.

Finally, one can use only one hemispherical magnet, magnetised radially. The other can, if required, be replaced by a non-magnetic hemisphere able to serve as guide in an assembly such as that shown in FIG. 11. It is to be noted that in this case the amplitude of each of the 2 signals will be halved.

A method for guiding the sphere in the gap between the stators 71 to 74 is to create a friction surface with which it will come directly into contact. The gap will then be ensured by the thickness of the material producing this guiding, a material which must evidently be non-magnetic.

According to the requirements of the mechanism itself, one can then choose whether to make the magnet rub directly or to cover it with a layer of an appropriate material to reduce friction, improve the lifetime of the mechanism etc.

FIG. 11 shows an application of this principle: the stators 71 and 73 have been enclosed in a plastic over-moulding which ensures the gap, the mechanical link between the stators and the moulding of the probes. This type of principle can also be used with any other process besides over-moulding: the plastic layer can be glued, clipped, or mounted in several different ways on the stators.

Another principle could consist of having only one magnetic hemisphere and of having on the complementary hemisphere a metallic spherical surface, which could be guided on a metallic cap.

Finally, this mechanism can be inverted, that is to say that the stators, 91 to 94, can be arranged inside the magnet 96. Then the support assembly becomes a hollow sphere and the stators 91 to 94 quarters of a sphere, in conformity with FIG. 13.

Figure 13:
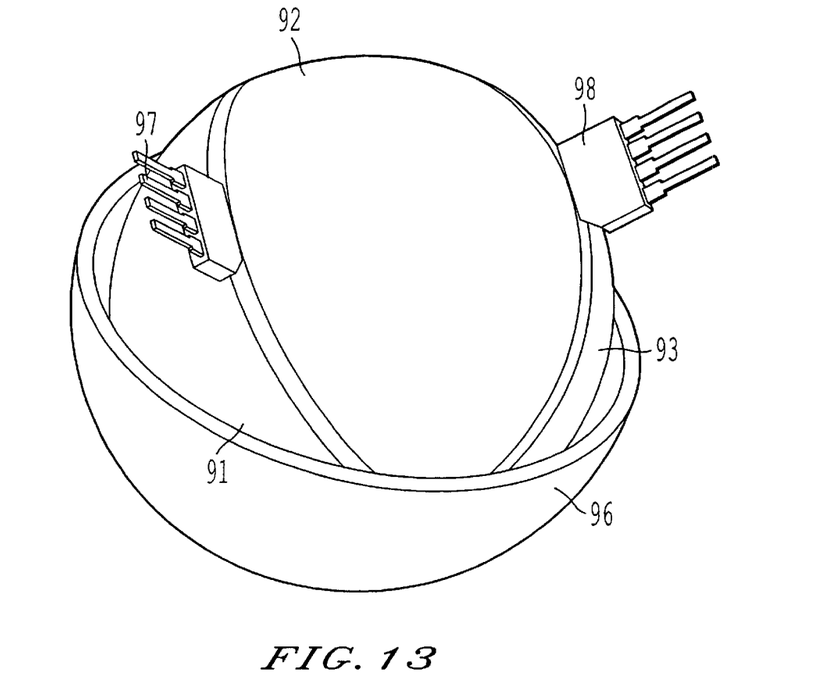
FIG. 13 shows another embodiment of a spherical sensor.

In the same way as above, 2 independent signals are obtained, respectively linear in function of the rotation relative to the X and Y axes.

The first will be the sum of the signals provided by the probe 97 and the diametrically opposite probe, and the second will be the sum of the signals provided by the probe 98 and the diametrically opposite probe.

The possibility remains of having only one magnetised hemisphere while losing half the amplitude of the signal.

There is the choice of making the magnet move with the support assembly (by attaching it on top, for example) or moving independently from it, or further maintaining it immobile to make the stators move. In this case, it is possible to use the same type of assembly as that described for the preceding solution.

Figure 14:
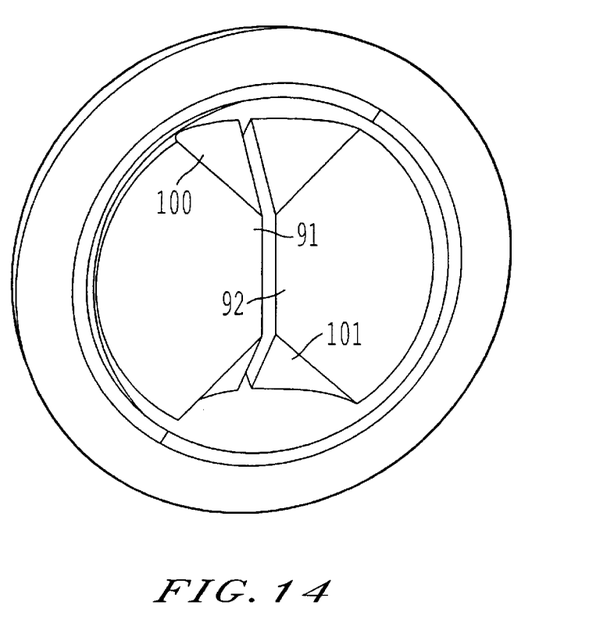
FIG. 14 shows a partial view of another embodiment variant of a spherical sensor.

Finally, one can imagine several types of stator shapes, FIG. 14 giving an example of a possible modification.

The stators 91 to 94 have flat sections 100, 101 making it possible to concentrate the magnetic fluxes towards the Hall probes, and to facilitate the fixation of a linkage unit.

The invention does not only relate to the embodiments described above, but also embodiment variants. In particular, it is possible to implement not 4 Hall probes, but two Hall probes only, one per secondary gap.

Figure 15:
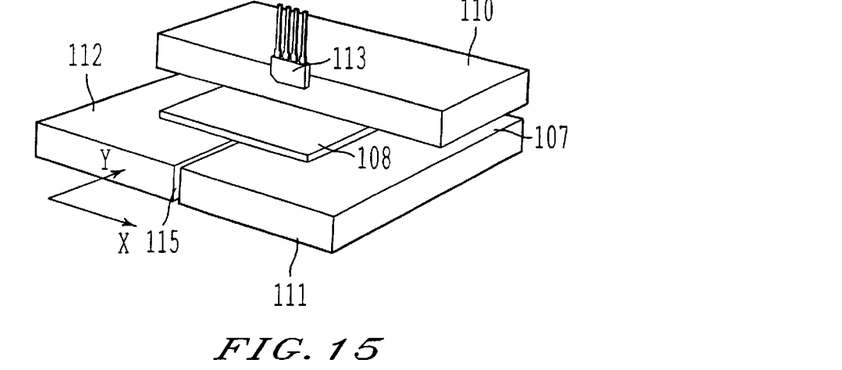
FIGS. 15 and 16 show partial and cross-sectional views of a bidirectional linear sensor with two Hall probes.
Figure 16:
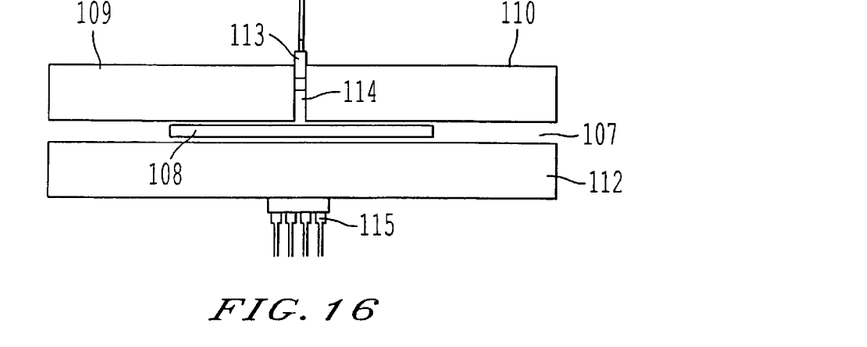

FIGS. 15 and 16 show partial and cross-sectional views of a two-dimensional linear sensor with two Hall probes. This system comprises the following parts:

A flat magnet 108, magnetised axially in the direction perpendicular to the main gap 107. It is mobile between the stators.

A first pair of rectangular ferromagnetic stators, 109 and 110, defining a first secondary gap 114.

A second pair of rectangular ferromagnetic stators, 111 and 112, defining a second secondary gap 116, oriented perpendicularly to the first secondary gap 114.

2 Hall probes 113 and 115 housed respectively in the first and second secondary gap.

When the magnet is displaced in its main gap, following the XY plane, it generates a magnetic induction variation in each of the 2 secondary gaps, a variation which is measured directly by the 2 probes.

Probe 115 then provides a linearly direct signal in function of the displacement relative to X.

Probe 113 then provides a linearly direct signal in function of the displacement relative to Y.

Figure 17:
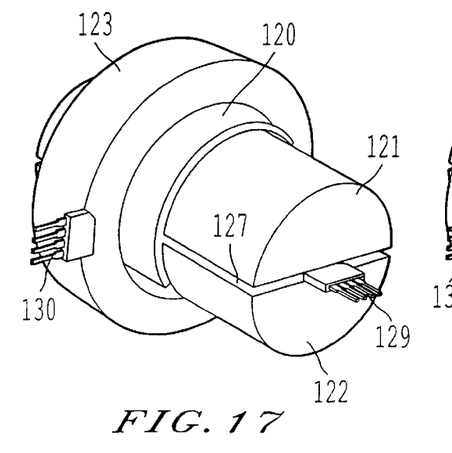
FIGS. 17 and 18 show views of a rotary linear sensor with two Hall probes.
Figure 18:
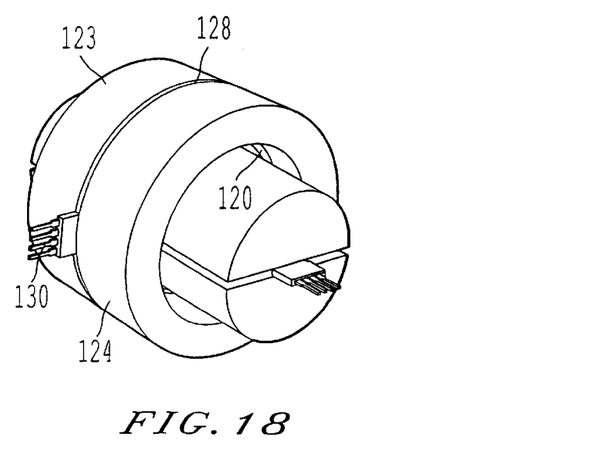

FIGS. 17 and 18 show views of a linear/rotary sensor with two Hall probes. This variant makes it possible to use only 2 Hall probes. The system is then composed of the following parts 1 half-ring magnet 120, magnetised radially. It is mobile between the stators.

4 ferromagnetic stators, internal 121 and 122, and external, 123 and 124. The internal stators 121 and 122 are of a half-moon shape, able to be chamfered if needed. They define a plane first secondary gap 127. The external stators 123 and 124 are rings and define the second secondary gap 128 of annular shape.

2 Hall probes, 129 and 130.

When the magnet is displaced in its main gap, in rotation and translation relative to axis X, it generates a variation in magnetic induction in each of the 2 secondary gaps, a variation which is measured directly by the 2 probes.

The probe 129 will provide a directly linear signal in function of the rotation of the magnet around the axis X.

The probe 130 will provide a directly linear signal in function of the translation of the magnet along the axis X.

Figure 19:
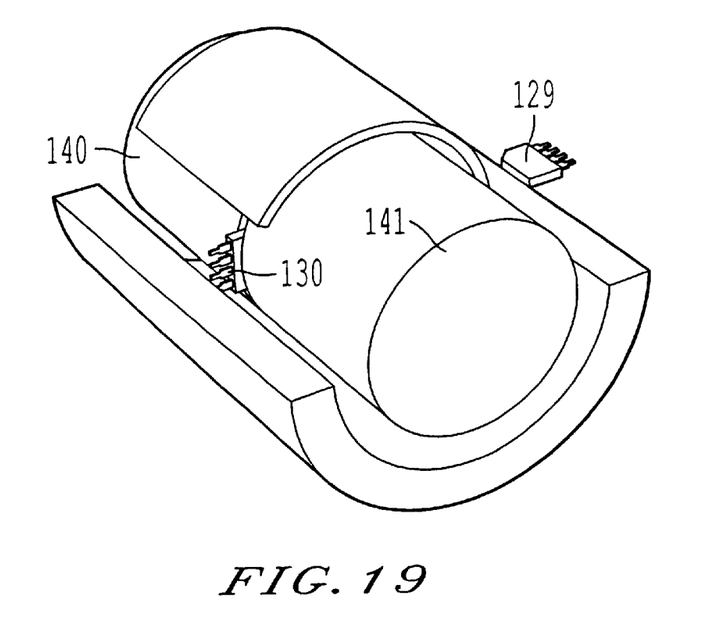
FIGS. 19 and 20 show views of a variant of a rotary linear sensor with two Hall probes.
Figure 20:
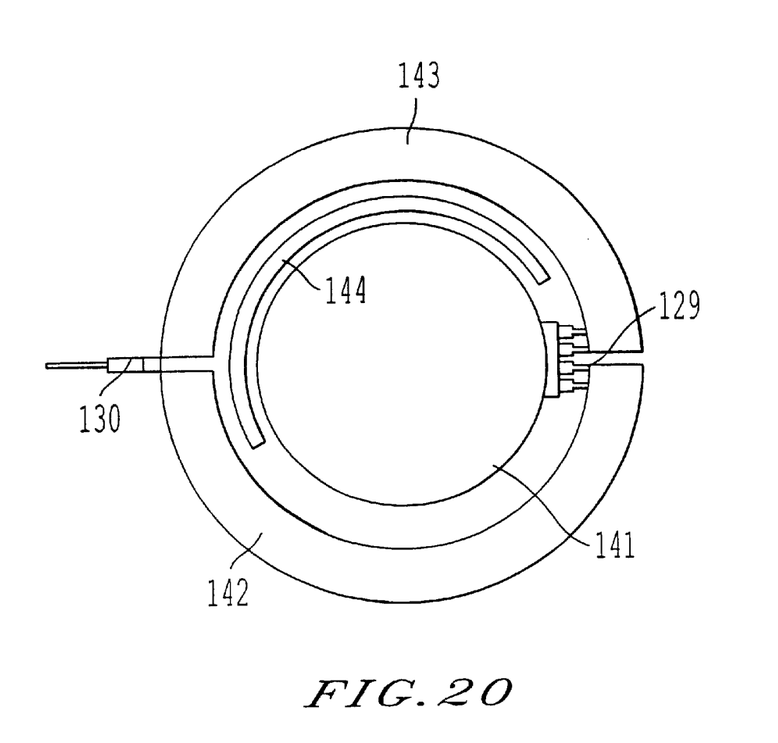

This principle can be inverted in relation to the magnet to obtain the drawing shown in FIGS. 19 and 20. The stators 140 and 141, then become internal cylinders and the stators 142 and 143 become external half-rings.

What is claimed is:

1. A position sensor, comprising:
    at least one stator structure having a main gap; and
    a mobile magnet in said main gap,
    said at least one stator structure consisting of,
        a single first secondary gap,
        a first Hall probe housed in said single first secondary gap and configured to deliver a first signal corresponding to a displacement of said mobile magnet relative to a first degree of freedom,
        a single second secondary gap, and
        a second Hall probe housed in said single second secondary gap and configured to deliver a second signal corresponding to a displacement of said mobile magnet relative to a second degree of freedom.

2. The position sensor according to claim 1, further comprising:
    a summer configured to sum said first signal and said second signal.

3. The position sensor according to claim 1, wherein:
    said stator structure comprises four stator poles formed in a magnetically permeable material, said single first secondary gap and said single second secondary gap arranged to cross at a median point, and said main gap is configured to have a shape of a plane, the plane being the gap between the base and the rectangular stator wherein the magnet is movable.

4. The position sensor according to claim 3, wherein:
    said four stator poles comprise four rectangular parts placed facing a support assembly, and
    said single first secondary gap and said single second secondary gap are arranged perpendicularly.

5. The position sensor according to claim 1, wherein:
    said mobile magnet has a thickness L and said main gap has a thickness E, wherein said thickness L and said thickness E are controlled to have a ratio L/E in a range between 1 and 2, inclusively.

6. The position sensor according to claim 5, wherein:
    said single first secondary gap and said single second secondary gap each comprise dimensions of $C_1+E$ and $C_2+E$, where $C_1$ and $C_2$ define a path of said mobile magnet.

7. The position sensor according to claim 1, further comprising:
    another first secondary gap so as to form a pair of first secondary gaps in a median transversal plane of said stator structure;
    a third Hall probe housed in said another first secondary gap and configured to deliver a third signal corresponding to said displacement of said mobile magnet relative to said first degree of freedom;
    another second secondary gap so as to form a pair of second secondary gaps of longitudinal slits; and
    a fourth Hall probe housed in said another second secondary gap and configured to deliver a fourth signal corresponding to said displacement of said mobile magnet relative to said second degree of freedom, wherein
    said mobile magnet has a half-tube shape,
    said first degree of freedom is an axial translation relative to said stator structure and said second degree of freedom is an axial rotation relative to said stator structure, and
    said stator structure comprises four cylindrical stator poles.

8. The position sensor according to claim 1, further comprising:
    another first secondary gap so as to form a pair of first secondary gaps in a median transversal plane of said stator structure;
    a third Hall probe housed in said another first secondary gap and configured to deliver a third signal corresponding to said displacement of said mobile magnet relative to said first degree of freedom;
    another second secondary gap so as to form a pair of second secondary gaps in said longitudinal median plane separating said four half-cylinder-shaped stator poles; and
    a fourth Hall probe housed in said another second secondary gap and configured to deliver a fourth signal corresponding to said displacement of said mobile magnet relative to said second degree of freedom, wherein
    said mobile magnet is tubular in shape,
    said first degree of freedom is an axial translation relative to said stator structure and said second degree of freedom is an axial rotation relative to said stator structure, and
    said stator structure is cylindrical and is formed of four half-cylinder-shaped stator poles.

9. The position sensor according to claim 8, wherein:
said four half-cylinder-shaped stator poles comprise a chamfered longitudinal edge.

10. The position sensor according to claim 1, further comprising:
another first secondary gap so as to form a pair of first secondary gaps in a first median plane of said stator structure;
a third Hall probe housed in said another first secondary gap and configured to deliver a third signal corresponding to said displacement of said mobile magnet relative to said first degree of freedom;
another second secondary gap so as to form a pair of second secondary gaps in a second median plane; and
a fourth Hall probe housed in said another second secondary gap and configured to deliver a fourth signal corresponding to said displacement of said mobile magnet relative to said second degree of freedom, wherein
said mobile magnet is spherical in shape and is mobile in spherical rotation relative to said stator structure, and
said stator structure has a shape of a spherical cap formed of four stator poles each having a shape of a cap sector.

11. The position sensor according to claim 1, further comprising:
another first secondary gap so as to form a pair of first secondary gaps in a first median plane of said stator structure;
a third Hall probe housed in said another first secondary gap and configured to deliver a third signal corresponding to said displacement of said mobile magnet relative to said first degree of freedom;
another second secondary gap so as to form a pair of second secondary gaps in a second median plane; and
a fourth Hall probe housed in said another second secondary gap and configured to deliver a fourth signal corresponding to said displacement of said mobile magnet relative to said second degree of freedom, wherein
said mobile magnet is spherical in shape and is mobile in spherical rotation relative to said stator structure, and
said stator structure has a spherical shape and is formed of four stator poles of internal spherical shape located around an equatorial plane of said mobile magnet.

12. The position sensor according to claim 1, further comprising:
another first secondary gap so as to form a pair of first secondary gaps in a first median plane of said stator structure;
a third Hall probe housed in said another first secondary gap and configured to deliver a third signal corresponding to said displacement of said mobile magnet relative to said first degree of freedom;
another second secondary gap so as to form a pair of second secondary gaps in a second median plane; and
a fourth Hall probe housed in said another second secondary gap and configured to deliver a fourth signal corresponding to said displacement of said mobile magnet relative to said second degree of freedom, wherein
said mobile magnet is spherical in shape and is mobile in spherical rotation relative to said stator structure, and
said stator structure has a spherical shape and is formed of four quarter-sphere shaped stator poles.

13. The position sensor according to claim 12, wherein:
said four quarter-sphere shaped stator poles comprise chamfers.

14. The position sensor according to claim 1, wherein:
said single first secondary gap and said single second secondary gap are configured to cross.

15. The position sensor according to claim 14, wherein:
said single first secondary gap and said single second secondary gap are configured to cross perpendicularly.

16. The position sensor according to claim 14, wherein:
said stator structure comprises two ferromagnetic half-moon shaped internal stators configured so that said single first secondary gap forms a plane and two ferromagnetic ring shaped external stators configured so that said single second secondary gap has an annular shape,
said mobile magnet is a radially magnetized half-ring magnet and is mobile between said two ferromagnetic half-moon shaped internal stators and said two ferromagnetic ring shaped external stators,
said first degree of freedom is a rotation around an axis X, and
said second degree of freedom is along said axis X.

17. The position sensor according to claim 14, wherein:
said stator structure comprises two ferromagnetic half-ring shaped external stators configured to define said single first secondary gap and two ferromagnetic cylindrical internal stators configured so that said single second secondary gap has an annular shape,
said mobile magnet is a radially magnetized half-ring magnet and is mobile between said two ferromagnetic half-ring shaped external stators and said two ferromagnetic cylindrical internal stators,
said first degree of freedom is a rotation around an axis X, and
said second degree of freedom is along said axis X.

18. The position sensor according to claim 1, further comprising:
another first secondary gap;
a third Hall probe housed in said another first secondary gap and configured to deliver a third signal corresponding to said displacement of said mobile magnet relative to said first degree of freedom;
another second secondary gap; and
a fourth Hall probe housed in said another second secondary gap and configured to deliver a fourth signal corresponding to said displacement of said mobile magnet relative to said second degree of freedom.

19. A position sensor, comprising:
at least one stator structure having a main gap; and
a mobile magnet in said main gap,
said at least one stator structure comprising,
four rectangular stator poles,
a first secondary gap,
a first Hall probe housed in the first secondary gap and configured to deliver a first signal corresponding to a displacement of said mobile magnet relative to a first degree of freedom,
a second secondary gap, and
a second Hall probe housed in the second secondary gap and configured to deliver a second signal corresponding to a displacement of said mobile magnet relative to a second degree of freedom.

20. The position sensor according to claim 19, further comprising another first secondary gap;

a third Hall probe housed in said another first secondary gap and configured to deliver a third signal corresponding to said displacement of said mobile magnet relative to said first degree of freedom;

another second secondary gap;

a fourth Hall probe housed in said another second secondary gap and configured to deliver a fourth signal corresponding to said displacement of said mobile magnet relative to said second degree of freedom; and a summer configured to sum said first signal, said second signal, said third signal and said fourth signal.

* * * * *